(12) United States Patent
Williams et al.

(10) Patent No.: US 9,389,139 B2
(45) Date of Patent: Jul. 12, 2016

(54) METHOD FOR STUDYING THE EVOLUTION OF DAMAGE IN CYLINDERS SUBJECTED TO INTERNAL RADIAL EXPLOSION

(71) Applicant: U.S. Army Research Laboratory, Washington, DC (US)

(72) Inventors: Cyril L. Williams, Newark, DE (US); Daniel R. Scheffler, Belcamp, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 170 days.

(21) Appl. No.: 14/331,921

(22) Filed: Jul. 15, 2014

(65) Prior Publication Data
US 2016/0018285 A1    Jan. 21, 2016

(51) Int. Cl.
| | | |
|---|---|---|
| G01M 7/00 | (2006.01) |
| G01N 3/00 | (2006.01) |
| G01P 15/00 | (2006.01) |
| F42B 99/00 | (2006.01) |
| G01M 7/08 | (2006.01) |
| F42B 35/00 | (2006.01) |

(52) U.S. Cl.
CPC .................. *G01M 7/08* (2013.01); *F42B 35/00* (2013.01); *F42B 99/00* (2013.01)

(58) Field of Classification Search
None
See application file for complete search history.

(56) References Cited

U.S. PATENT DOCUMENTS

| | | | | |
|---|---|---|---|---|
| 3,739,731 | A * | 6/1973 | Tabor ..................... | F42B 33/06 109/49.5 |
| 3,786,956 | A * | 1/1974 | Tabor ..................... | B65D 81/07 206/3 |
| 4,734,611 | A * | 3/1988 | Granz ................... | B06B 1/0688 310/324 |
| 6,581,521 | B1 * | 6/2003 | Dixon .................... | F42B 12/46 102/334 |
| 7,036,418 | B2 * | 5/2006 | Greenfield ............... | F42D 5/04 222/548 |
| 7,373,867 | B2 * | 5/2008 | Ryan ................... | F41H 13/0043 588/403 |
| 9,234,732 | B1 * | 1/2016 | Cummings, III ....... | F42B 39/14 |

OTHER PUBLICATIONS

Pearson, J., and Rinehart, J., Journal of Applied Physics, 23,434-441, 1952.
Allison, F. E., and Schriempf, J. T., Journal of Applied Physics, 31, 846-851, 1960.
Hoggatt, C. R., and Recht, R. F., Journal of Applied Physics, 39, 1856-1862, 1968.
Warnes, R. H., Karpp, R. R., and Follansbee, P. S., Journal de Physique, 583-590, 1985.

(Continued)

*Primary Examiner* — Peter Macchiarolo
*Assistant Examiner* — Jermaine Jenkins
(74) *Attorney, Agent, or Firm* — Christos S. Kyriakou (57) ABSTRACT

A method for extracting material and mechanical properties of a cylinder subject to expansion cause by an explosion so as to better understand the evolution of damage. The method is directed towards obtaining material and mechanical properties of the cylinder between an undeformed state and a state of deformation prior to total fracture. The method includes the steps of providing: (1) a plurality of cylinders, each of which have the same physical dimensions; (2) a plurality of charges, each of the plurality of charges having a different diameter and hence explosive force; and (3) a fluid having a shock impedance less than a shock impedance of any of the plurality of charges. The method further includes the step of placing the charges in a respective cylinders, tilling the cylinder with the fluid and detonating the charge, and recording the cylinder radial velocity during radial expansion and post-mortem material properties.

8 Claims, 10 Drawing Sheets

(56) References Cited

OTHER PUBLICATIONS

Bola, M.S., Madan, A.K., Singh, M., and Vasudeva, S.K., Defence Science Journal, vol. 42, No. 3, 157-163, 1992.

Goto, D. M., Becker, R., Orzechowski, T. J., Springer, H. K., Sunwoo, A. J., and Syn, C. K., International Journal of Impact Engineering, 35, 1547-1556, 2008.

Martineau, R. L., Anderson, C. A., and Smith, F. W., Experimental Mechanics, Hiroe, T., Fujiwara, K., Hata, H., Yamauchi, M., Tsutsumi, K., and Igawa, T., Materials Science Forum, vols. 638-642, 1035-1040, 2010.219-225, 2000.

Tiegang, T., Guowu, R., Zhaoliang, G., and Qingzhong L., Review of Scientific Instruments, 84, 043908, 2013.

\* cited by examiner

METHOD FOR STUDYING THE EVOLUTION OF DAMAGE IN CYLINDERS SUBJECTED TO INTERNAL RADIAL EXPLOSION

GOVERNMENT INTEREST

The invention described herein may be manufactured, used, and licensed by or for the United States Government.

FIELD OF THE INVENTION

The present invention relates to a method for extracting physical properties of a cylinder subject to expansion cause by an explosion so as to better understand the evolution of damage.

BACKGROUND OF THE INVENTION

Understanding how a cylinder expands in response to an explosion is instrumental in modeling, analysis and development of materials suitable for use in such cylinders. However, current methods for examining the expansion of cylinders focus primarily on fragment size and distribution of the fragments. In current methods, two data points are obtained from which mechanical and material properties may be extracted. The two data points are acquired from an undeformed state and the deformed state after fracture. However, measurements are not taken between the undeformed state and the deformed state after fracture.

Accordingly, the current methodology for studying materials undergoing explosive expansion does not take into consideration the evolution of damage during the expansion of a cylinder. Without considering the evolution of damage during the expansion, it remains unknown how damage evolves from the undeformed state to the deformed state during the high strain and strain rate expansion of the cylinder. Understanding the evolution of damage during an explosively driven expansion can facilitate a greater understanding of how materials behave while subjected to explosive forces, and may help create more accurate models of the expanding cylinder, which may in turn assist with the development of materials suited for use in extreme dynamic environments such as those experienced during ballistic events. Accordingly, it remains desirable to have a method for examining the evolution of damage of a cylinder.

SUMMARY OF THE INVENTION

A method of extracting material and mechanical properties of a cylinder subjected to expansion, wherein the cylinder is expanded by explosion, is provided. The method is directed towards examining a cylinder's mechanical and material properties to specific residual radial strains and strain rates after the expansion thereof by an explosion contained therein. The method utilizes a plurality of cylinders each dimensioned uniformly with respect to each other, and each made of the same material. A plurality of charges are set within a respective cylinder, wherein the exploded cylinder is examined. Each of the charges are of different explosive forces, and the material and mechanical properties of the cylinders after each charge is recorded and processed so as to trace the evolution of damage done to the cylinder.

The method includes the step of providing a plurality of cylinders, each of the plurality of cylinders have the same physical dimensions and made of the same material. The method includes the step of providing a plurality of charges, each of the plurality of charges having a different explosive force. The method further includes the step of providing a fluid having a shock impedance less than a shock impedance of any of the plurality of charges. The method proceeds to the step of placing one of the charges within one of the cylinders and filling the cylinder with the fluid. The cylinder has a closed bottom and capped on its open top so as to form a sealed enclosure holding both the charge and the fluid. The charge is detonated and the material and mechanical properties of the cylinder is recorded with respect to the amount of explosive force exerted within the cylinder. The method continues with the step of placing another charge, which is greater than the previous within a cylinder, and filling the cylinder with the fluid. The cylinders are detonated with incrementally greater charges, in a like manner, until a charge creates such a fracture and fragmentation of the cylinder that the material and mechanical properties of said fractured/fragmented cylinder do not provide useful data.

DETAILED DESCRIPTION OF THE INVENTION

Figure 1:
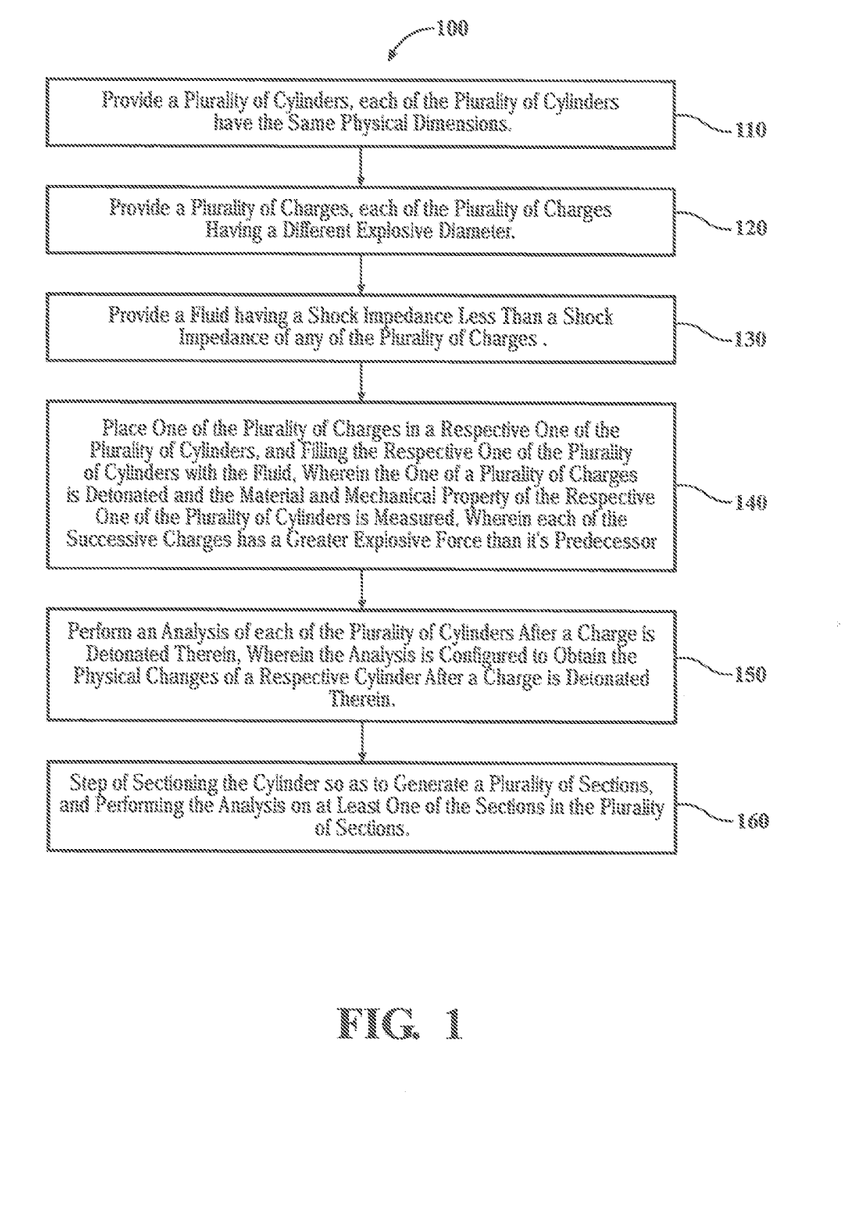
FIG. 1 is a schematic flowchart of a method according to an embodiment of the present invention.

With reference now to FIG. 1, a method 100 for extracting material and mechanical properties of a cylinder 10 subject to expansion cause by an explosion so as to better understand the evolution of damage is provided. The method 100 is directed towards correlating mechanical and material properties to specific residual radial strains and strain rates after the expansion and release of the explosively driven cylinder 10. The correlation of mechanical and material properties to residual radial strains and strain rates may facilitate the understanding of failure processes and hence the design of and material selection for cylinders 10 for use in extreme dynamic pressure.

Figure 2:
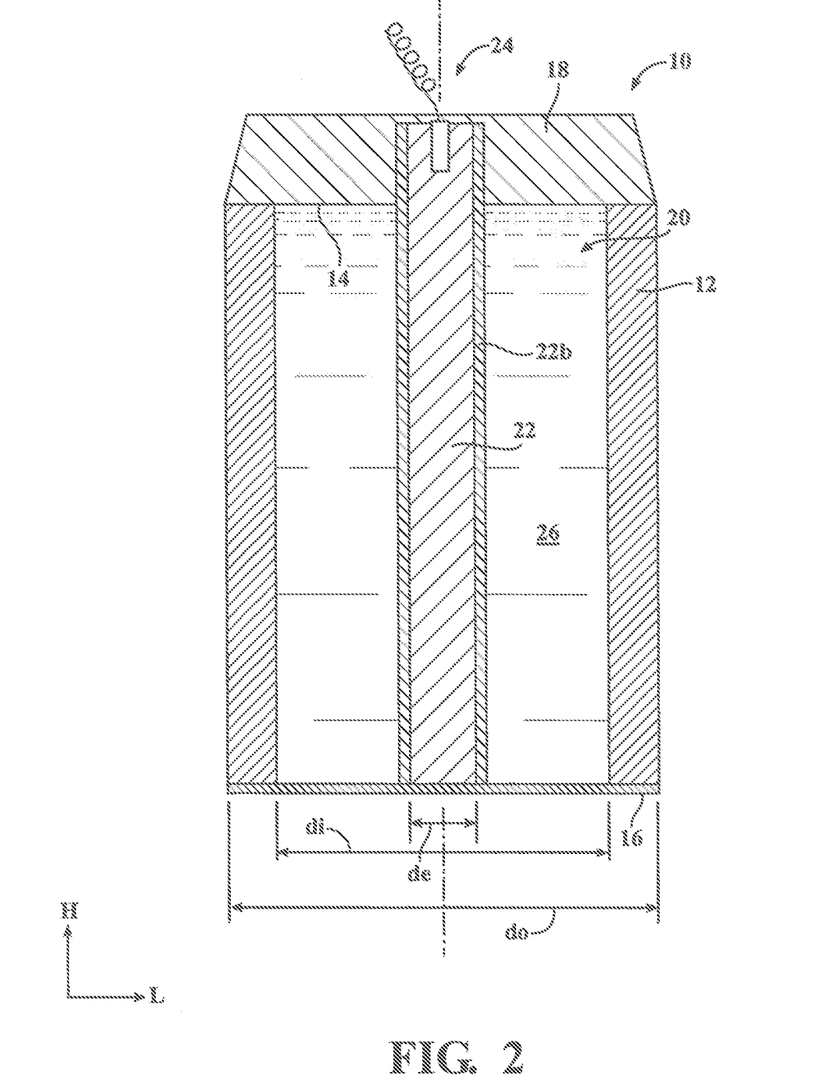
FIG. 2 is an illustrative illustration of a cylinder for use in the method of FIG. 1.

The method 100 includes step 110, providing a plurality of cylinders 10, each of the plurality of cylinders 10 have the same physical dimensions and are made of the same material as the others. With reference now to FIG. 2, an exemplary illustration of a cylinder 10 for use herein is provided. Accordingly, the cylinders 10 provide a benchmark for the effect of an explosion. The cylinder 10 is representative of the plurality of cylinders 10, also referenced herein as a test set of cylinders 10. The test set of cylinders 10 may be representative of a cylinder 10 for use in an explosive device such as an artillery round, a rocket propelled missile, or a casing for which an explosive charge is held.

The cylinder 10 includes a wall 12 defining a generally elongated body with a central opening 14. The wall 12 is formed of a metallic material, such as copper, aluminum, tantalum, or steel. Preferably, the wall 12 is of a uniform thickness. The cylinder 10 includes an inner diameter, "di" and an outer diameter, "do" and a length measured along the L axis shown in FIG. 2. For illustrative purposes, the cylinder 10 is shown having a length of 400 mm with an inner diameter (di) and outer diameter (do) of 100 mm and 120 mm respectively, thus the wall 12 thickness is 10 mm. The bottom of the cylinder 10 is closed by a bottom cap 16, which may be formed as a separate piece, or may be integrated thereto. The top opening 14 of the cylinder 10 may be closed by a top cap 18 so as to define a sealed inner chamber 20, wherein the contents of the cylinder 10 are contained therein. It should be appreciated that the dimensions provided are for illustrative purposes and should not be limiting to the scope of the teachings and the claims. Further, it should be appreciated the dimensions and physical composition of a cylinder 10 used in the method 100 described herein are the same as the other cylinders 10 which comprise the test set of cylinders 10.

With reference again to FIG. 1, the method 100 includes the step 120, providing a plurality of charges 22. Each charge 22 is configured to emit an explosive force different than the other. Preferably, the charge 22 is positioned along the central axis of the cylinder 10. The charge 22 is shown as having a generally cylindrical body extending between the top and bottom caps 18, 16 of the cylinder 10. The dimensions of the cylinder 10 are kept constant, while the explosive charge 22 is varied. The charge 22 includes a detonator 24 configured to actuate the charge.

As shown in FIG. 2, the detonator 24 may be mounted to a top edge of the charge 22 so as to detonate the charge 22 within the inner chamber 20 of the cylinder 10. The detonator 24 is illustratively shown as a fuse. However, it should be appreciated that other detonators 24 may be used in the method 100 described herein, illustratively including an electrical charge, or a mechanical detonating device employing a primer and a firing pin.

Though the charge 22 is shown as having a fuse projecting outwardly from an exposed surface of the top cap 18, it should be appreciated that the detonator 24 may be actuated remotely and wirelessly. The charges 22 for use with a cylinder 10 having the dimensions described above, and formed of a Comp-B material. The charge 22 is configured to generate a radial expansion of the wall 12 of the cylinder 10 with respect to the central axis. Charges 22 configured to explode and generate a radial expansion of the wall 12 of the cylinders 10 are currently known and used, and illustratively include a charge commonly referenced by those skilled in the art as Comp-B, TNT, PBX, RDX, and PETN.

The charges 22 are uniform in physical composition, but may be varied in explosive force so as to provide the effect that an explosion has within the set of test cylinders 10. Thus, the correlation between explosive forces is made by increasing the diameter (de) of the charge 22. It should be appreciated by those skilled in the art that the explosive energy produced by the larger diameter (de) of the explosive charge 22 is greater than that produced by the smaller diameter (de) of the explosive charge 22. The charge 22 is shown formed in a solid cylindrical dimension extending generally the axial length of the cylinder 10, between the top and bottom caps 18, 16. However, it should be appreciated that the shape of the charge 22 is provided for illustrative purposes, and the charge 22 may be shaped otherwise.

The method 100 includes the step 130, providing a fluid 26 having a shock impedance less than a shock impedance of any of the plurality of charges 22. The charge 22 may be enclosed in a tubular seal 22b. The tubular seal 22b may be centered within the inner chamber 20. The tubular seal 22b is configured to shield the charge 22 from the fluid 26. The fluid 26 is configured to lower the shock pressure through impedance ($\rho U_s$) mismatch, $\rho$ is density and $U_s$ is the shock velocity, so as to help prevent the cylinder 10 from being fractured. As the shock wave passes from the high impedance explosive charge 22 across the interface to the relatively low impedance of the fluid 26, the shock pressure drops.

The fluid 26 is further configured to attenuate the shock wave as it travels through the fluid 26. The distance between the tubular seal-fluid interface and wall-fluid interface decreases as the diameter (de) of the charge 22 increases. Therefore, the attenuation of the shock wave decreases with decrease in distance traveled by the shock wave across the fluid 26. Consequently, the radial expansion of the explosively driven cylinder 10 is arrested earlier for an explosive charge 22 having a smaller diameter (de) as compared with those of an explosive charge 22 having a larger diameter (de).

The method 100 includes step 140, wherein one of the plurality of charges 22 is placed in a respective one of the plurality of cylinders 10. The cylinder 10 is filled with the fluid 26 and the cylinder 10 is sealed off, wherein the charge 22 is detonated and the material and mechanical properties of the cylinder 10 is measured. The cylinders 10 are each filled with a charge 22 and detonated, such that the various charges 22 replicate the different stages of radial expansion of the cylinder 10. Preferably the cylinders 10 are detonated with charges 22 in an incrementally increasing explosive force such that each of the successive charges 22 has a greater explosive force than its predecessor.

The method 100 may further include step 150, wherein the cylinder 10 is recovered for post-mortem analysis. For use herein, post-mortem refers to the state of the cylinder 10 after a charge is detonated therein.

The method 100 may further include step 160, wherein the cylinder 10 may be sectioned for post-mortem analysis, wherein physical properties such as changes in electrical conductivity, electromagnetism, hardness, yield strength, etc. are measured at various stages of expansion or radial strain. Post-mortem analysis may also be directed towards observing changes in material properties such as dislocation density, dislocation substructure, microstructure (grains), deformation twins, adiabatic shear bands, crystallographic texture, the nucleation, growth, coalescence of voids, and etc.

With reference again to FIG. 1, the execution of the method 100 is provided. A number of metallic cylinders 10 are gathered, each being of uniform dimension and material composition. Preferably, a charge 22 is placed in the center of one of the cylinders 10, and the fluid 26 is poured into the cylinder 10, filling the cylinder 10. In a preferred embodiment, the fluid 26 is water. Water is employed for three reasons, the first is to lower the shock pressure through impedance ($\rho U_s$) mismatch, where $\rho$ is density and $U_s$ is the shock velocity. As the shock wave passes from the high impedance explosive charge 22 across the interface to the low impedance water, the shock pressure drops. The second reason is to attenuate the shock wave as it travels through the water. The distance between the tubular seal-water interface and metal-water interface decreases as the explosive charge diameter (de) increases.

Therefore, the attenuation of the shock wave decreases with decrease in distance traveled by the shock wave across the water. Lastly, water is easily accessible and absolutely safe to handle.

The top end cap 18 is mounted to the open top, and the detonator 24 is actuated. The explosive force of the charge 22 is recorded, in a log book or an electronic database. It should also be appreciated that the size, shape and material of the cylinder 10 are also recorded. The radial velocity of the cylinder 10 may be examined during the explosion.

For instance, the free surface velocity of the expanding cylinder wall 12 can be acquired by Photon Doppler Velocimetry (PDV) or Velocity Interferometry System for Any Reflector (VISAR) (see FIG. 1). After each experiment, the metallic cylinder 10 may be recovered and sectioned for post-mortem analysis.

The method 100 continues by utilizing another untested cylinder 10 from test set of cylinders 10 and a different charge 22 is placed into the cylinder 10 and the same fluid 26 poured therein. Preferably, the charges 22 are increased in explosive forces. When using a Comp-B charge, the explosive force may be increased by simply increasing the diameter (de) of the Comp-B charge, also referenced herein as the diameter (de). Increasing the diameter (de) of the explosive charge 22 increases the residual radial diameter of the metallic cylinder 10; consequently, the residual radial strain increases.

The diameter (de) of the explosive charge 22 is gradually increased until the early stages of fracture occur (often referred to as first smoke). First smoke implies that the material has fractured but not totally separated to form fragments and it is the ultimate point at which useful data can be obtained using this experimental method 100.

Accordingly, the free surface velocity can be obtained using PDV/VISAR and the residual radial strain can be estimated from the recovered cylinder 10. Also, the recovered cylinder 10 can be sectioned and polished for post-mortem analysis from which mechanical and material properties can be extracted. For instance, post-mortem analysis of the recovered cylinder 10 may reveal changes in physical properties such as electrical conductivity, electromagnetism, hardness, yield strength, etc. at various stages of expansion or radial strain.

Further, changes in material properties such as dislocation density, dislocation substructure, microstructure (grains), deformation twins, adiabatic shear bands, crystallographic texture, etc may be observed. The nucleation, growth, and coalescence of voids can also be studied using post mortem analysis. Furthermore, the formation of cracks and how they grow during the elastic-plastic expansion of explosively driven cylinders 10 can be studied.

Multiple simulations were conducted using the CTH hydrocode to demonstrate and validate the feasibility of the method 100 described herein. Oxygen Free High Conductivity (OFHC) copper was used to simulate the free expansion of the explosively driven cylinders 10. The length of the cylinder 10 was 400 mm. Comp-B was the explosive used and water was the liquid medium. The simulations were conducted using 4 mm, 8 mm, 12 mm, 16 mm, 24 mm, 32 mm, and 100 mm (fully filled) explosive charge diameters respectively, the results of which are shown in FIGS. 3-9 respectively.

Figure 3:
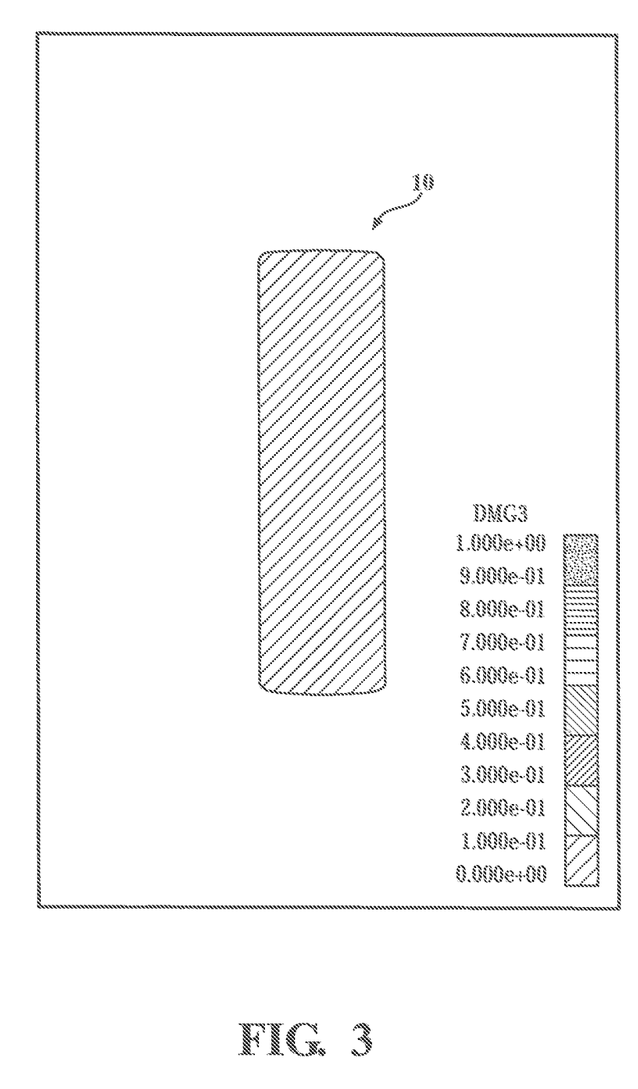
FIG. 3 is a cylinder prior to detonation.

Tracer particles were imbedded within the wall 12 at the mid-point (200 mm) of the OFHC copper cylinder 10 in order to track the radial expansion with respect to time. With reference again to FIGS. 3 through 10, of each figure represents the full view of the expanding cylinder 10 and shows damage as a function of time. FIG. 3 shows the undeformed configuration of the OFHC copper prior to detonation. From the contours in FIG. 3, it is evident that the damage prior to detonation is zero. This implies that the material is pristine (no damage) at zero pressure or at time equals zero.

Figure 4:
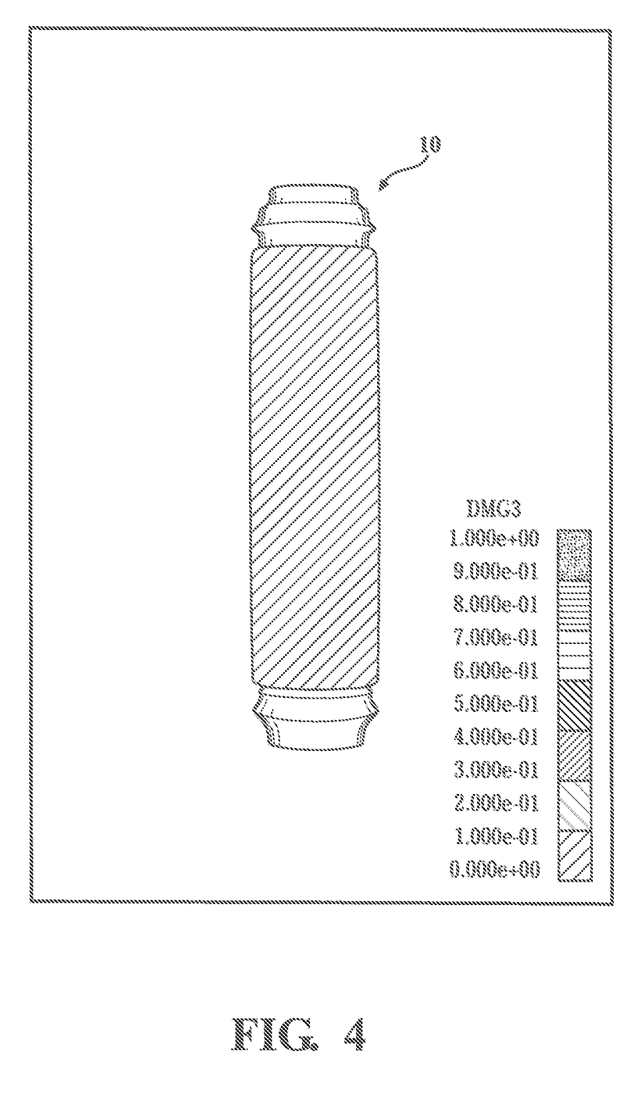
FIG. 4 is a simulation result showing damage of an explosively driven cylinder with 4 mm diameter explosive charge post-mortem.
Figure 5:
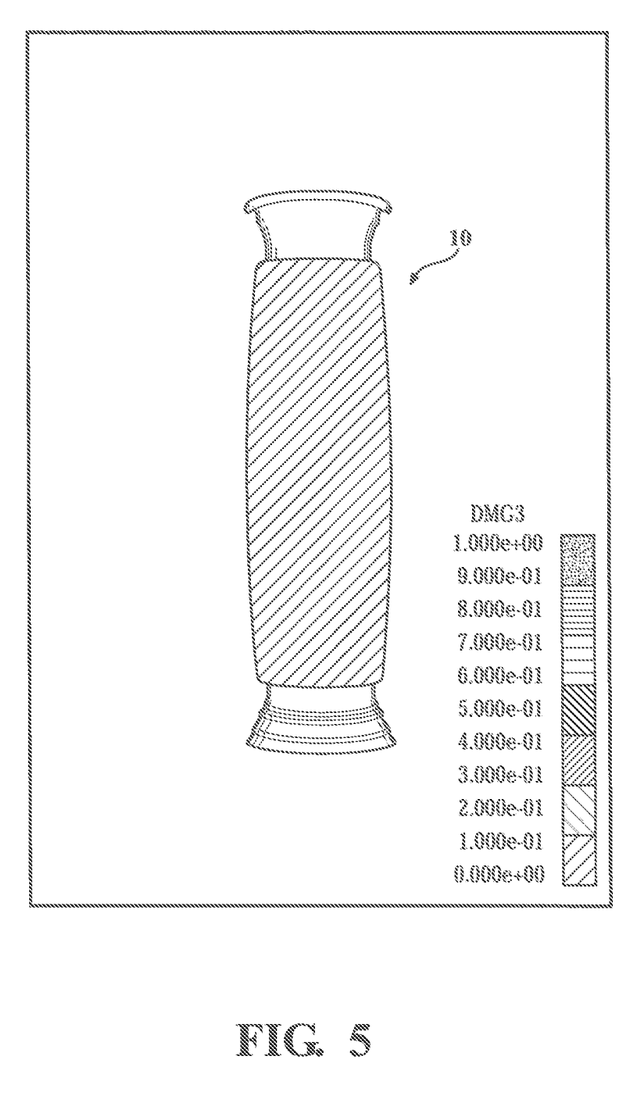
FIG. 5 is a simulation result showing damage of an explosively driven cylinder with 8 mm diameter explosive charge post-mortem.
Figure 6:
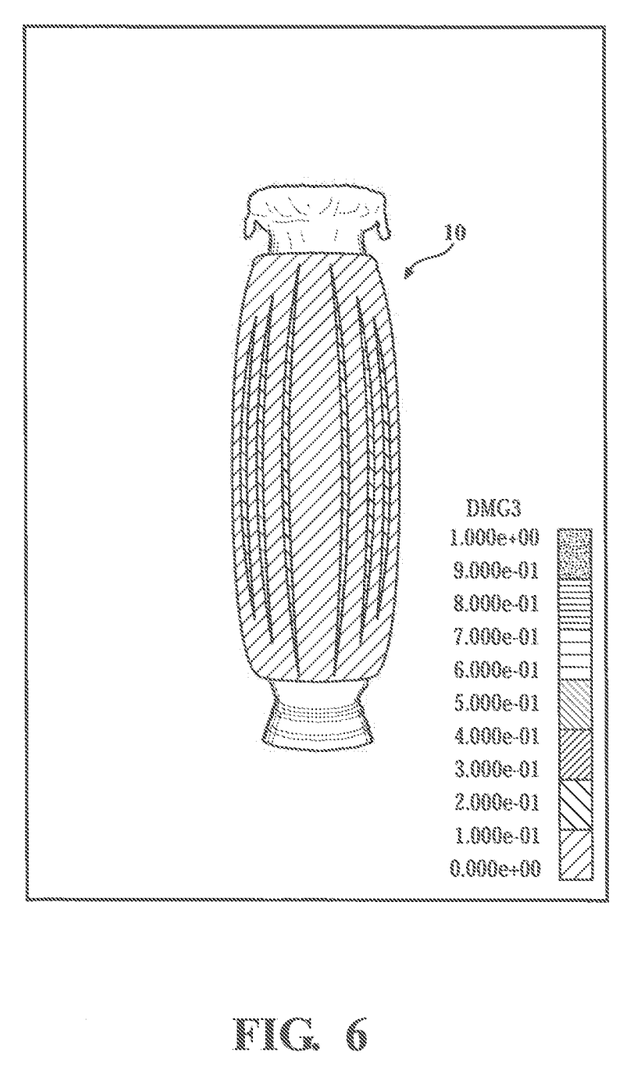
FIG. 6 is a simulation result showing damage of an explosively driven cylinder with 12 mm diameter explosive charge post-mortem.
Figure 7:
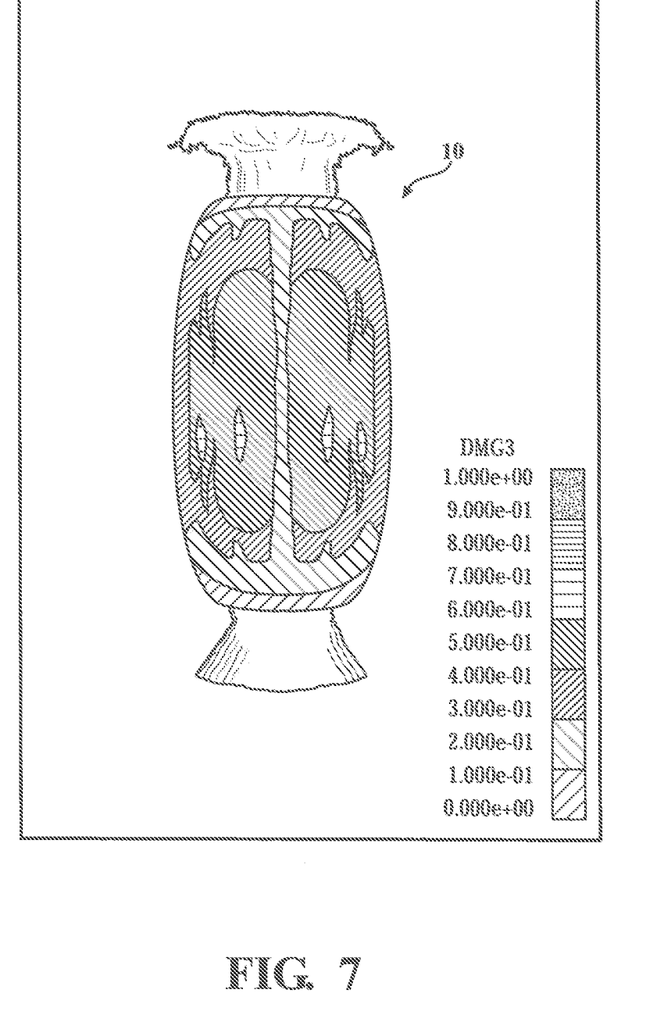
FIG. 7 is a simulation result showing damage of an explosively driven cylinder with 16 mm diameter explosive charge post-mortem.
Figure 8:
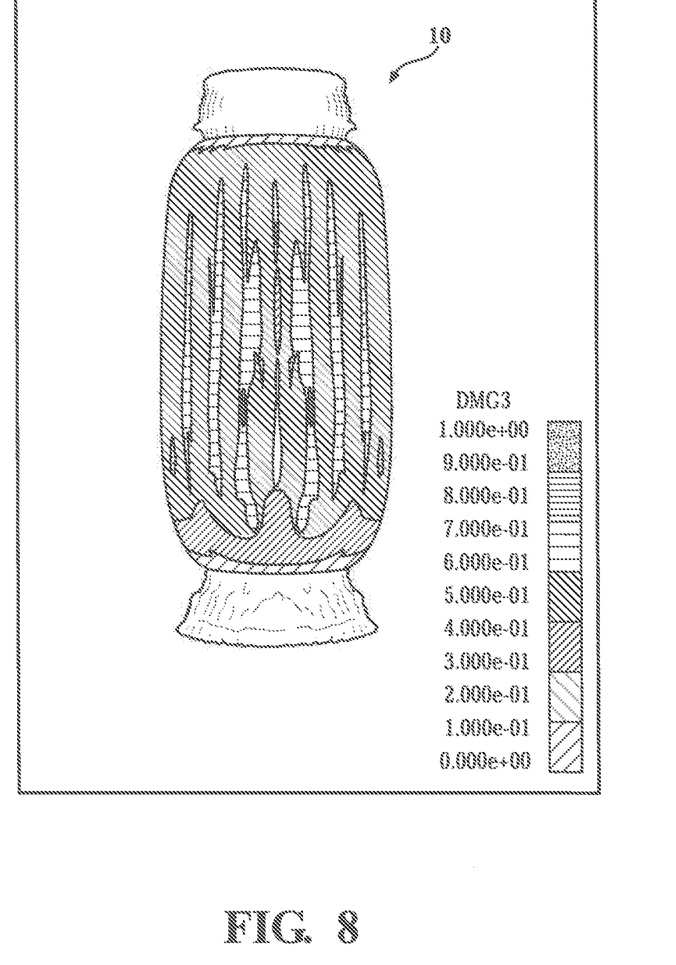
FIG. 8 is a simulation result showing damage of an explosively driven cylinder with 24 mm diameter explosive charge post-mortem.
Figure 9:
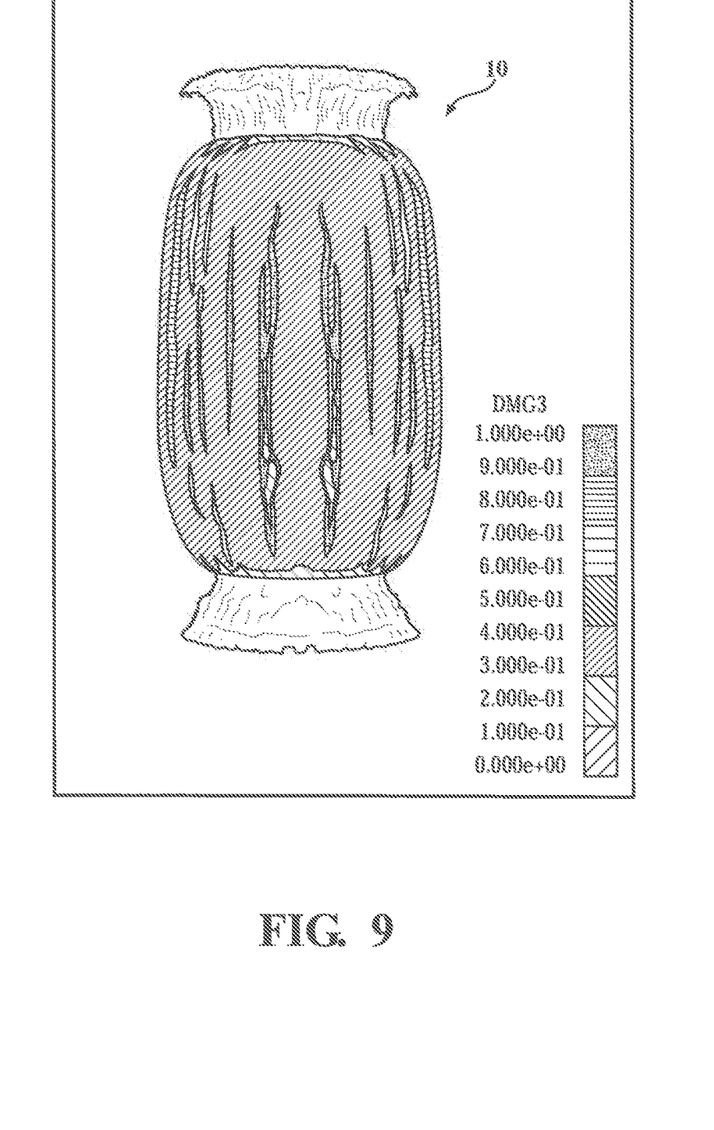
FIG. 9 is a simulation result showing damage of an explosively driven cylinder with 32 mm diameter explosive charge post-mortem.
Figure 10:
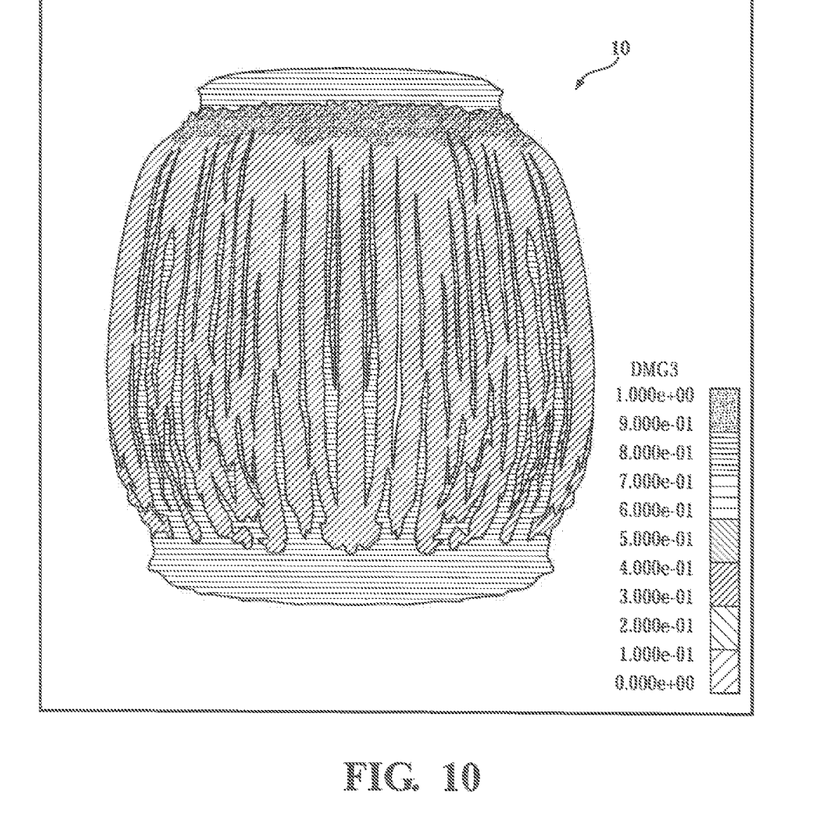
FIG. 10 is a simulation result showing damage of an explosively driven cylinder with 100 mm diameter explosive charge post-mortem.

With reference now to FIG. 4, the 4 mm diameter explosive charge 22 results are provided. The OFHC copper cylinder 10 reaches maximum radial expansion without exhibiting any damage. Similarly, as shown in FIG. 5, the 8 mm diameter explosive charge 22 did not produce any damage at maximum radial expansion. However, from the simulation results in FIG. 6, the first evidence of damage (although minimum) was observed at maximum radial expansion for the 12 mm diameter explosive charge 22 with no visible fracture. With further increase in the diameter of the explosive charge 22 up to 16 mm, more evidence of damage was observed with some visible fracture (see FIG. 7). From FIGS. 8 and 9, extensive damage and fracture were observed for the 24 mm and 32 mm diameter explosive charges 22 respectively. Finally, FIG. 10 shows the results for 100 mm diameter explosive charge 22 wherein, severe damage and fragmentation occurred of the cylinder 10. The hydrocode simulations results show that the 16 mm explosive charge diameter (Comp-B) will produce the desired radial expansion in OFHC copper for post mortem analysis. Increasing the explosive charge diameter (Comp-B) beyond 16 mm will produce severe fracture and fragmentation, which may not be useful for extracting pertinent data.

Obviously, many modifications and variations of the present invention are possible in light of the above teachings and may be practiced otherwise than as specifically described.

We claim:

1. A method for extracting material and mechanical properties of a cylinder subject to expansion cause by an explosion so as to better understand the evolution of damage, the method comprising the steps of:
   providing a plurality of cylinders, each of the plurality of cylinders have the same physical dimensions;
   providing a plurality of charges, each of the plurality of charges having a different explosive force;
   providing a fluid having a shock impedance less than a shock impedance of any of the plurality of charges; and
   placing one of the plurality of charges in a respective one of the plurality of cylinders, and filling the respective one of the plurality of cylinders with the fluid, wherein the one of a plurality of charges is detonated and the physical characteristic of the respective one of the plurality of cylinders is measured, wherein each of the successive charges has a greater explosive force than its predecessor.

2. The method set forth in claim I wherein the fluid is water.

3. The method as set forth in claim 1, further including the step of performing an analysis of each of the plurality of cylinders after a charge is detonated therein, wherein the analysis is configured to obtain the material and mechanical changes of a respective cylinder after a charge is detonated therein.

4. The method as set forth in claim 3, wherein the analysis detecting the electrical conductivity, electromagnetism, hardness, yield strength of a respective cylinder.

5. The method as set forth in claim 3, further including the step of sectioning the cylinder so as to generate a plurality of sections, and performing the analysis on at least one of the sections in the plurality of sections.

6. The method as set forth in claim 5, further including the step of polishing at least one of the plurality of sections, and performing an analysis on the polished section.

7. The method as set forth in claim 1, wherein the cylinder is formed of a metallic material.

8. The method as set forth in claim 1, wherein the metallic material consists of one selected from the group comprising copper, aluminum, tantalum, or steel.

* * * * *